(12) United States Patent
Huber et al.

(10) Patent No.: US 9,721,162 B2
(45) Date of Patent: Aug. 1, 2017

(54) FUSION-BASED OBJECT-RECOGNITION

(71) Applicant: AGT International GmbH, Zurich (CH)

(72) Inventors: Marco Huber, Weinheim (DE); Andreas Merentitis, Berlin (DE); Roel Heremans, Darmstadt (DE); Christian Debes, Mühltal (DE)

(73) Assignee: AGT International GMBH, Zurich (CH)

( * ) Notice: Subject to any disclaimer, the term of this patent is extended or adjusted under 35 U.S.C. 154(b) by 0 days.

(21) Appl. No.: 14/740,300

(22) Filed: Jun. 16, 2015

(65) Prior Publication Data
US 2015/0363643 A1 Dec. 17, 2015

(30) Foreign Application Priority Data
Jun. 16, 2014 (SG) .............................. 10201403293T

(51) Int. Cl.
G06K 9/00 (2006.01)
G06T 11/60 (2006.01)
G06N 7/00 (2006.01)
G06K 9/62 (2006.01)

(52) U.S. Cl.
CPC ....... *G06K 9/00624* (2013.01); *G06K 9/6288* (2013.01); *G06K 9/6292* (2013.01); *G06N 7/005* (2013.01); *G06T 11/60* (2013.01); *G06T 2207/10004* (2013.01); *G06T 2207/20221* (2013.01)

(58) Field of Classification Search
CPC .. G06K 9/6201; G06K 9/6277; G06K 9/6278; G06K 9/6288; G06K 9/6289; G06K 9/6292; G06K 9/6296; G06T 2207/20076; G06N 7/005
See application file for complete search history.

(56) References Cited

U.S. PATENT DOCUMENTS

| 6,944,342 | B1 * | 9/2005 | Stahl et al. .................. 382/224 |
| 7,298,877 | B1 * | 11/2007 | Collins et al. ............... 382/128 |
| 8,468,111 | B1 * | 6/2013 | Tgavalekos et al. .......... 706/45 |
| 2008/0162389 | A1 * | 7/2008 | Aboutalib ..................... 706/15 |

(Continued)

FOREIGN PATENT DOCUMENTS

| EP | 1983666 B1 | 10/2010 | |
| EP | 2615561 A1 | 7/2013 | ............. G06F 17/17 |
| EP | 2704065 A1 | 3/2014 | ............. G06N 99/00 |

(Continued)

OTHER PUBLICATIONS

Anastasi G et al.: "Energy conservation in wireless sensor networks: A survey", Ad Hoc Network, Elsevier, vol. 7, No. 3, May 1, 2009, pp. 537-568, XP 026185309, ISSN: 1570-7805, DOI: 10.1016/J.ADHOC.2008.06.003 [retrieved on Jul. 29, 2008].

(Continued)

*Primary Examiner* — Andrew W Johns
(74) *Attorney, Agent, or Firm* — Browdy and Neimark, PLLC

(57) ABSTRACT

An object-recognition method and system employing Bayesian fusion algorithm to reiteratively improve probability of correspondence between captured object images and database object images by fusing probability data associated with each of plurality of object image captures.

5 Claims, 3 Drawing Sheets

(56) References Cited

U.S. PATENT DOCUMENTS

2014/0316736 A1    10/2014    Strohbach et al.    ..... G01D 11/00

FOREIGN PATENT DOCUMENTS

| WO | WO 2008/057451 A2 | 5/2008 | ............... G06K 9/00 |
| WO | WO 2013/072282 A1 | 5/2013 | ............ H04W 84/18 |
| WO | WO 2013/083823 A1 | 6/2013 | ............ G06Q 10/04 |
| WO | WO 2014/023607 A1 | 2/2014 | ............ G06N 99/00 |

OTHER PUBLICATIONS

Boulis A et al.: "Aggregation in sensor networks: an energy accuracy trade-off", New Frontiers in Telecommunications : 2003 IEEE International Conference on Communications ; ICC 2003 ; May 11-15, 2003, Anchorage, Alaska, USA; [IEEE International Conference on Communications], IEEE Operations Center, Piscataway, NJ, Jan. 1, 2003 (Jan. 1, 2003), pp. 128-138, XP010642624, ISBN: 978-0-7803-7802-5.

Deshpande C. et al.: Model-Driven Data Acquisition in Sensor Networks, In Proceedings of the 30th Very Large Data base Conference (VLDB 2004) Toronto, Canada, Aug. 2004.

Dieter Fox et al.: "Bayesian Filtering for Location Estimation", IEEE Pervasive Computing, IEEE Service Center, Los Alamitos, CA, US , vol. 2, No. 3 Sep. 30, 2003 (Sep. 30, 2003), pp. 24-33, XP002598055, ISSN: 1536-1268.

Emiliano Miluzzo et al: "CaliBree: A Self-calibration System for Mobile Sensor Networks", Distributed Computing in Sensor Systems : 4th IEEE International Conference, Dcoss 2008, Santorini Island, Greece, Jun. 11-14, 2008; Proceedings; [Lecture Notes in Computer Science], Springer, Berlin, Heidelberg, vol. 5067, Jun. 11, 2008 (Jun. 11, 2008), pp. 314-331, XP002668228, ISBN: 978-3-540-69169-3.

European Search Report from EP11189417 dated Feb. 28, 2012.
European Search Report EP11192890 dated May 7, 2012.
European Search Report from EP2615561 dated Jul. 23, 2012.
European Search Report EP12179412 dated Dec. 21, 2012.

Feng J et al.: "Model-based calibration for sensor networks", Proceedings of Ieee Sensors 2003 (Ieee Cat. No. 03ch37498) IEEE Piscataway, Nj, Usa; [IEEE International Conference on Sensors], IEEE, vol. CONF. 2, Oct. 22, 2003 (Oct. 22, 2003), pp. 737-742vol. 2, XP010691005, DOI: 10.1109/ICSENS.2003.1279039 ISBN: 978-0-7803-8133-9.

Guestrin C et al.: "Distributed Regression: An Efficient framework for Modeling Sensor Network Data", Information Processing in Sensor networks, 2004, IPSN 2004, Third International Symposium, Apr. 26, 2004, pp. 1-10, XP009070537, ISBN: 978-1-58113-846-7.

Halkidi M et al.: "Clustering validity checking methods", ACM Sigmod Record, vol. 31, No. 3, Sep. 1, 2002, XP55032760, ISSN: 0163-5808, DOI: 10.1145/601858.601862.

Harrington B et al.: "Energy-Efficient Map Interpolation for Sensor Fields Using Kriging", IEEE Transactions on Mobile Computing, IEE Service center, Los Alamitos, CA, US, vol. 8, No. 5, May 1, 2009, pager 622-635, XP011335350, ISSN: 1536-1233, DOI: 10.1109/TMC.2008.167.

Hou Chaojun et al.: "Cluster Based Routing Scheme for Distributed Regression in Wireless Sensor Network: Gaussian Eliminations". High Performance Computing and Communications, 2008. HPCC '08. 10th IEEE International Conference on, IEEE Piscataway, NJ, USA, pp. 813-818, XP031344297, ISBN: 978-0-7695-3352-0.

Hou Chaojun et al.: "Energy-efficient in routing scheme for distributed regression in wireless sensor network", Control Conference 2008, CCC 2008, 27th Chinese, IEEE, Piscataway, NJ, USA, pp. 354-358, XP031311542, ISBN: 978-7-900719-70-6.

International Search Report together with Written Opinion from PCT/EP2012/072409 dated Jan. 14, 2013.
International Search Report together with Written Opinion from PCT/EP2012/074875 dated Feb. 6, 2013.
International Search Report together with Written Opinion from PCT/EP2013/065960 dated Sep. 9, 2013.
International Search Report together with Written Opinion from PCT/EP2015/063436 dated Aug. 12, 2015.

Sanford Jessica Feng et al.: "On-line sensor calibration and error modeling using single actuator stimulus", Aerospace Conference, 2009 IEEE, IEEE, Piscataway, NJ, USA, Mar. 7, 2009 (Mar. 7, 2009), pp. 1-11, XP031450069, ISBN: 978-1-4244-2621-8.

Jing Zhou et al.: "FloodNet: Coupling Adaptive Sampling with Energy Aware Routing in a Flood warning System", Journal of Computer Science and Technology, Kluwer Academic Publishers Bo, vol. 22, No. 1. Feb. 14, 2007. pp. 121-130, XP019485538, ISSN: 1860-4749, DOI: 10.1007/S11390-007-9017-7.

Ko Jonathan et al.: "GP-BayesFilters: Bayesian filtering using Gaussian process prediction and observation models", Intelligent Robots and Systems, 2008. IROS 2008. IEEE/RSJ International Conference on, IEEE, Piscataway, NJ, USA, Sep. 22, 2008 (Sep. 22, 2008), pp. 3471-3476, XP031348720, ISBN: 978-1-4244-2057-5.

Mahawaththa M D W S et al.: "Location aware queries for sensor network", Advance in ICT for Emerging regions (ICTER) 2011 International Conference on , IEEE. Sep. 1, 2011, pager 2-8, XP031990376. DOI: 10.1109/ICTER.2011.6075018. ISBN: 978-1-4577-1113-8.

Mourikis A and Roumeliotis S.I.: "Optimal Sensor Scheduling for Resource-Constrained Localization of Mobile Robot Formations", in IEEE Transactions on Robotics, 22(5), Oct. 2006, pp. 917-931.

Mukhopadhyay S et al.: "Model based error correction for wireless sensor networks", Sensor and Ad Hoc Communications and Networks, 2004. IEEE Secon 2004. 2004 First Annual Ieee Communications Society Conference on Santa Clara, CA, USA Oct. 4-7, 2004, Piscataway, NJ, USA,IEEE, Oct. 4, 2004 (Oct. 4, 2004), pp. 575-584, XP010759635, DOI: 10.1109/SAHCN.2004.1381960, ISBN: 978-0-7803-8796-6.

Osborne M A et al.: "Towards Real-Time Information Processing of Sensor Network Data Using Computationally Efficient Multi-output Gaussian Processes", Information Processing in Sensor Networks, 2008. IPSN '08. International Conference on, IEEE, Piscataway, NJ, USA, Apr. 22, 2008 (Apr. 22, 2008), pp. 109-120, XP031246704, ISBN: 978-0-7695-3157-1.

Rasmussen Carl E: Gaussian Processes for Machine Learning, MIT Press 2006.

Santini S.: "Adaptive Sensor Selection Algorithms for Wireless Sensor Networks", PhD thesis, ETH Zurich, Switzerland, 2009.

\* cited by examiner

FUSION-BASED OBJECT-RECOGNITION

BACKGROUND OF THE INVENTION

Recognizing an object (e.g., a person or a car) by means of a single recognition system employing a facial recognition camera or license plate recognition system can lead to a high error rate due to varying environmental conditions or partial object occlusion.

This invention proposes a data fusion system that combines the results of many image capture devices or detectors as well as travel time of the object between them in order to improve the recognition rate.

For this purpose, the recognition task is considered a classification problem, where a class corresponds to a particular object from a black list. The classification problem is solved by way of a Bayesian fusion algorithm, which operates on learned statistical models of recognition scores, travel time, and prior information. All these statistical models are generated machine learning algorithms from training data and can be combined in arbitrary fusion using modular data structure.

BRIEF DESCRIPTION OF THE DRAWINGS

The subject matter regarded as the invention is particularly pointed out and distinctly claimed in the concluding portion of the specification. The invention, its method of operation, features, and advantages may best be understood with reference to the following detailed description in view of the accompanying drawings in which:

Figure 1:
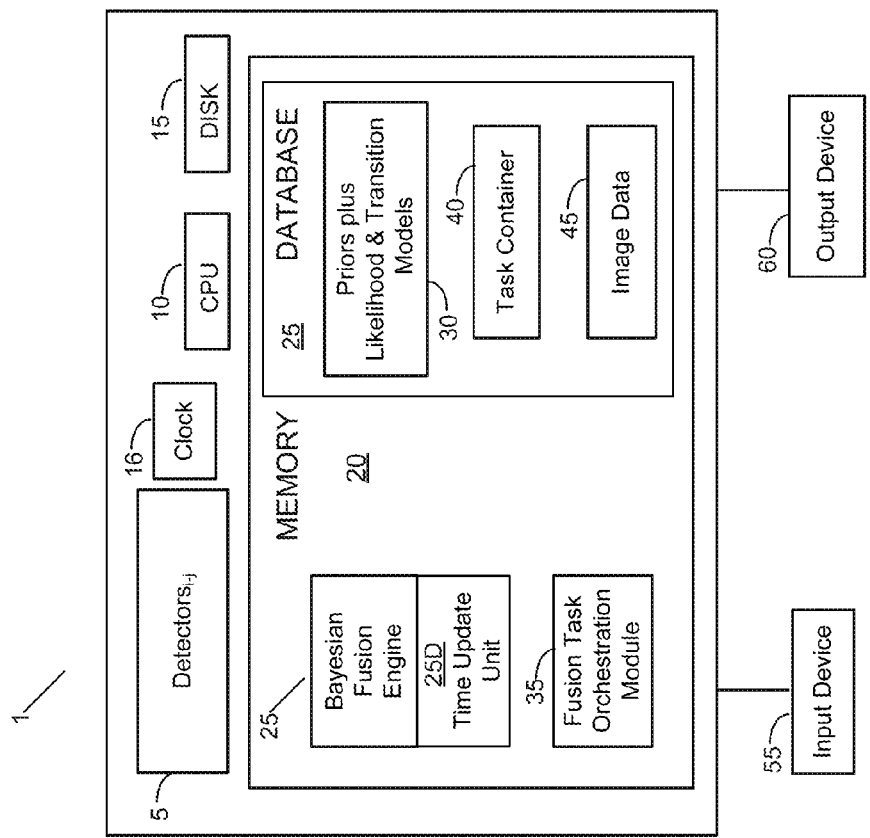
FIG. 1 is block diagram of an object recognition system, according to an embodiment of the present invention.

It will be appreciated that for clarity figure elements may not be been drawn to scale and reference numerals may be repeated among the figures indicating corresponding or analogous elements.

DETAILED DESCRIPTION OF THE PRESENT INVENTION

In the following description, numerous details are set forth in order to provide a thorough understanding of the invention. However, it will be understood that the present invention may be practiced without these specific details. Furthermore, well-known methods, procedures, and components have not been described in detail so as not to obscure the present invention.

The present invention is a fusion-based object recognition system achieving object recognition by fusing data from a plurality of component object recognition systems together with temporal data.

Referring now to the figures, FIG. 1 is a block diagram of a fusion-based, object-recognition system 1, according to an embodiment. System 1 includes one or more detectors 5 like any commercial-of-the-shelf face recognition camera providing scores like those available at company Axis, www.axis.com/academy/identification/resolution.htm for example.

System 1 also includes one or more clocks 16 linked to detectors 5, one or more processors 10, one or more long term storage disks 15, memory 20 loaded with, inter alia, a Bayesian fusion engine 25, fusion task orchestration module 30, a database of priors plus transition and likelihood models 35, a fusion task container 40, and image data 45.

It should be appreciated that any of the data may be stored in part or in entirely in disks 15.

Furthermore, system 1 includes user-input device 55, and an output device 60. Input device 55 may be implemented as touch-screens, keyboard, microphone, pointer device, or other devices providing such functionality and output device 60 may be implemented as any one or a combination of devices like a display screen, speakers or headphones, or other devices providing such functionality.

Memory 20 may be implemented as Random Access Memory (RAM) or other memory types providing such functionality.

As shown, memory 20 is loaded with Fusion Task Orchestration module 35. Orchestration module 35 is configured to assign incoming recognition data to an active fusion task or creates a new fusion task for it.

As shown, memory 20 is also loaded with Bayesian Fusion Engine 25. Fusion Engine 25 is configured to calculate a probability value for each class, where a class can correspond to a particular object (e.g., probability of object A is x % and of object B is y %) or a class can be binary (e.g., probability of object A is x %, and of not being object A is 100–x %).

In a certain embodiment Bayesian Fusion Engine 25 includes a time update component 25D configured to calculate the probability of an object moving from detectors $5_i$ to $5_j$ in time t, for example. Based on this transition probability, the class probability can be adjusted. The transition probability is provided by a Transition Model learned a priori from training data in an unsupervised fashion based on time measurements between various linked detectors without annotations; i.e. in a totally automated fashion. In certain embodiments, the transition model 25D distinguishes three phases of transitions of an object:

Impossible: A transition of an object between two RSs is physically not possible, which reduces the class probability.

Plausible: A transition is possible from a timing perspective. Class probabilities are (almost) not changed.

Uncorrelated: A transition took too long, such that there is almost no temporal correlation between two detections. Class probabilities are equalized.

Bayesian Fusion Engine 25 also includes a second component configured to update measurements. The score values of the detections of a fusion task are combined using Bayes' rule. The likelihood of a score is calculated by means of a likelihood model, according to an embodiment. Construction of arbitrary complex likelihood models, a modular structure for combining multiple predefined likelihood models is employed using basic operations used for combining learned likelihood models, e.g., sum, product, scale, constant. A prior learned by means of a supervised machine learning algorithm. Especially for score values, Gaussian mixture models are learned by means of an EM algorithm with automatic model selection. To improve the model selection (i.e., the optimal number of mixture components), a novel initialization procedure is employed that avoids the standard random clustering (K means) initialization and uses mixture splitting instead.

If the fusion task merely contains a single detection corresponding to a newly created fusion task and no time update is performed (no travel information available). Instead, a so-called prior is used to initialize the fusion. The prior is also learned a prior by means of supervised machine learning or statistical methods according to certain embodiments.

The present fusion-based object-recognition system 1 has application for the detection of various types of objects as noted above. Without diminishing in scope, system operation will be described in terms of detecting and identifying a person using facial recognition cameras.

Figure 2:
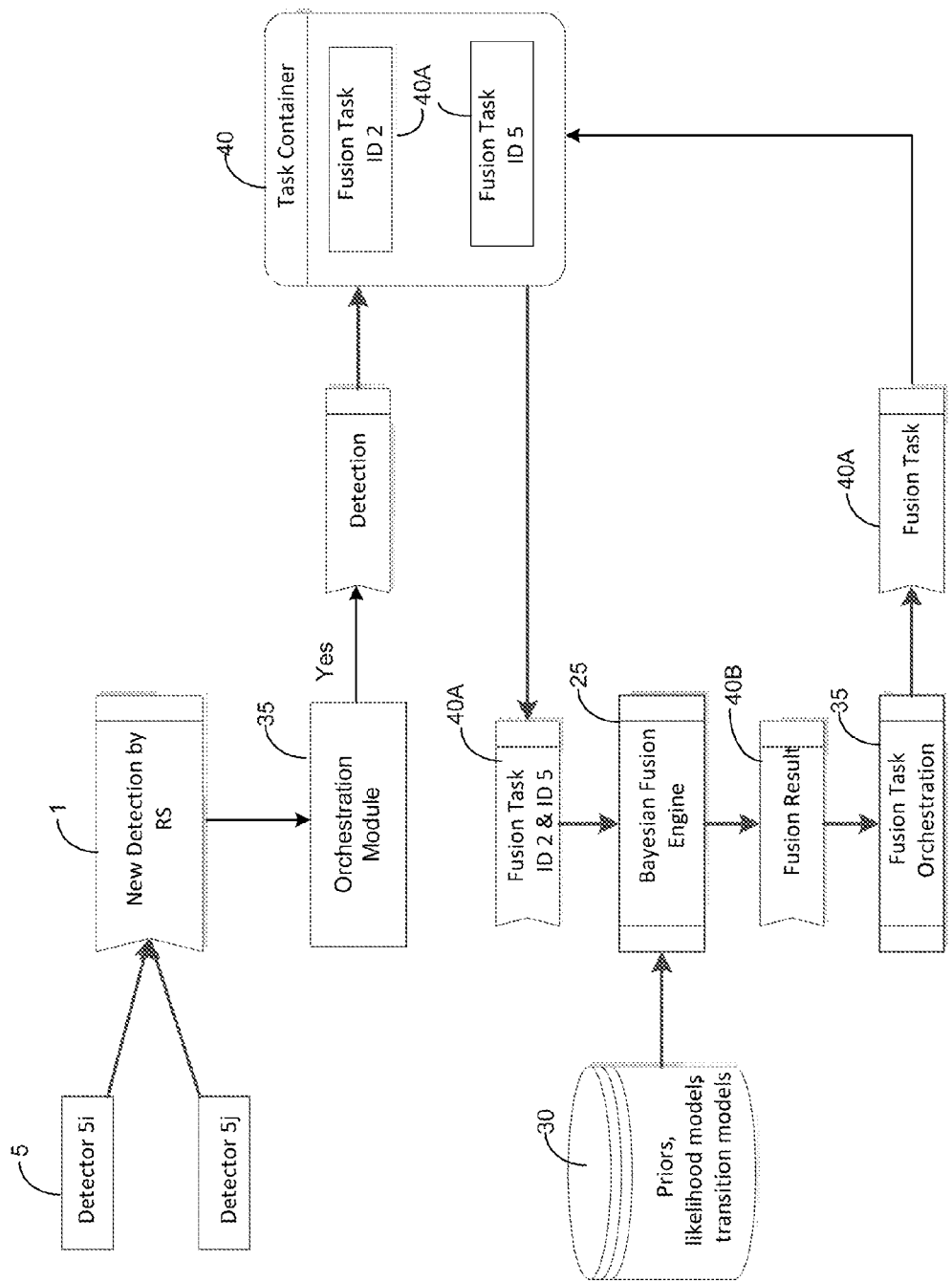
FIG. 2 is a flow chart of on overall fusion approach, according to an embodiment of the present invention.

By way of example and in reference to FIGS. 1-3 operation of fusion-based recognition system is as follows. A template image for each person of a black list or other interest is stored in image data 45 together with an associated identifier (ID). As shown in FIG. 2, detectors 5 captures a face image of a person that may be one of the people on the blacklist; but also, may be a person not on the black list.

System 1 or the detectors 5 compare the captured image with each of the five template images on the black list stored in image data 45 and calculates a similarity value called score for each of the five people on the black list. The score is typically a value between 0 and 1, where 0 means "not matching at all" and 1 means "perfect match".

After calculating the scores, system 1 creates a detection $D_1$ parameter which includes three elements, according to an embodiment:

1. A sorted list of scores with corresponding person IDs:
   This example assumes that the list comprises two elements. Thus, the two highest scores are part of the detection, e.g.
   ID 2, score 0.7
   ID 5, score 0.6
   That is, the person of the black list with ID 2 has been assigned the score 0.7 and for person with ID 5, the assigned score is 0.6. If the observed person is not on the black list, it is very likely that all scores are very close or even equal to zero. The length of this list is system defined parameter.
2. The time stamp of the detection. The recognition system 1 is configured to time stamp each detection. In this example let the time step of this first detection be t=1 second. In a certain embodiment a clocking mechanism is implemented as a single clock 16 linked to all detectors 5 whereas in other embodiments a plurality of clocks 16 synchronized with each other are employed, each associated with one or more detectors 5.
3. A credibility value:
   This value quantifies the reliability of detector. This value is typically between 0 and 1, with 0="fully unreliable" and 1="fully reliable". In this example, 5 detector has a credibility value of c=0.9. The reliability may be defined automatically by system 1 or manually according to the embodiment.

Detection parameter is passed to the Fusion Task Orchestration module 35. This module is responsible for assigning the detection to an appropriate Fusion Task A Fusion Task reflects a data structure that stores the results of the fusion and is associated to particular persons being part of the score list. All open fusion tasks are stored in the Task Container 40. In certain embodiments, a Fusion Task can be closed after a pre-defined time out.

In this example, task container is empty 40. Thus, Fusion Task Orchestration module 35 creates a new Fusion Task $T_1$ that is associated with person of ID numbers 2 and 5, as these are the two elements of the detection. The detection is assigned to the Task and then the Task is sent to the Bayesian Fusion Engine. In a certain embodiment, two new Fusion Tasks are created; a first task associated with the person of ID number 2 and second task associated with the person of ID number 5. It should be appreciate that the orchestration module 35 in certain embodiments will deice if there is a fusion task open and if not, will open one.

Figure 3:
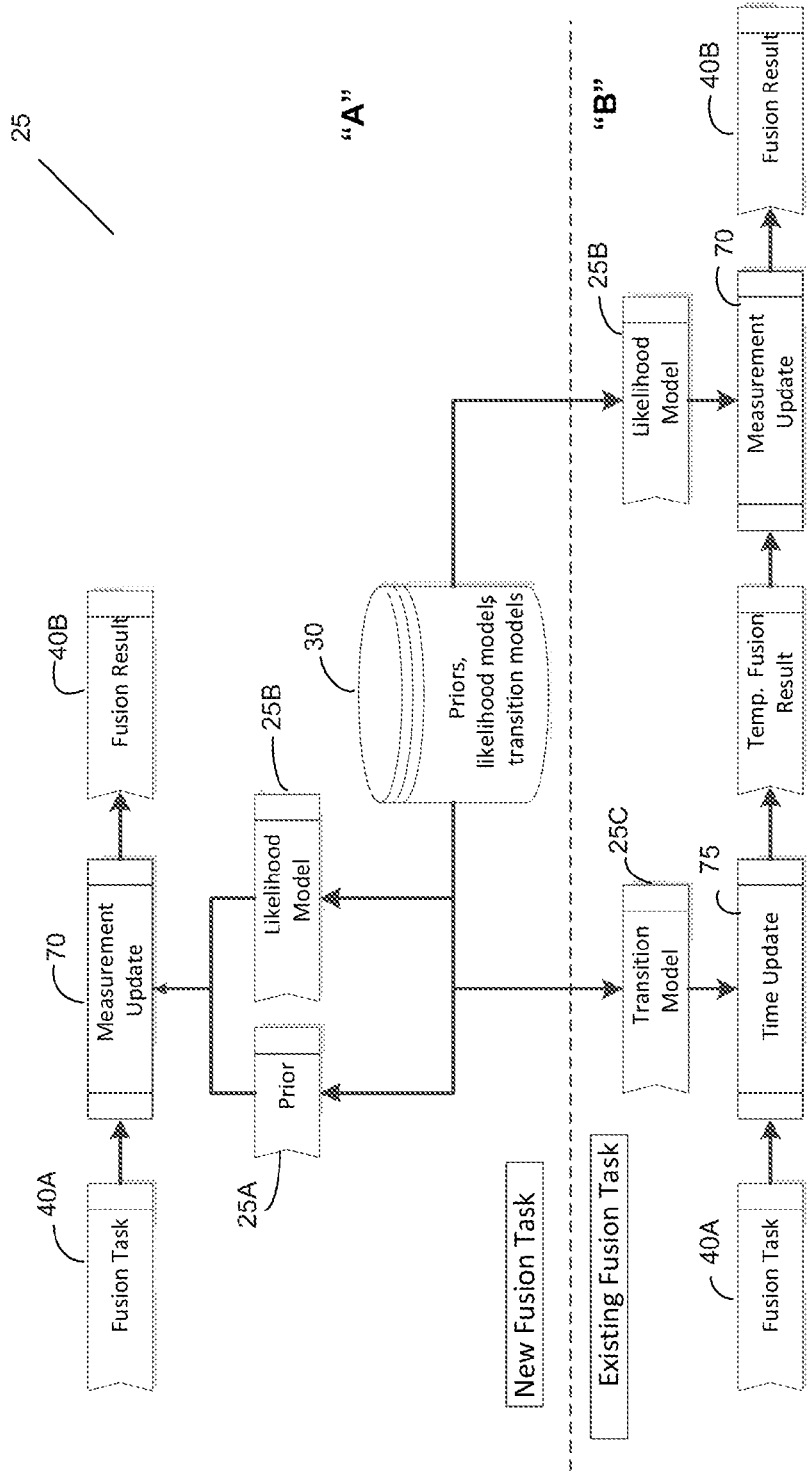
FIG. 3 is a flow chart of a Bayesian fusion engine, according to an embodiment of the present invention.

Bayesian Fusion Engine 25 then calculates the probability of which person from the black list has actually been observed by a detector 5 by utilizing the Bayesian rule as shown in FIG. 3.

Referring now to the processing steps depicted in section "A" of FIG. 3 relating to a newly related fusion task, the formula for calculating the probability of person i with i=0, . . . , 5 is:

$$p(i|D_1) = \frac{p(D_1|i) \cdot p(i)}{p(D_1)},$$

where p (i) is the prior probability of person i 25A, $p(D_1|i)$ is the likelihood of detection $D_1$ 25B, and p $(D_1)$ is a normalization constant. Often the prior probability is uniform and thus, p(i)=1/6. It is important to note that i=0 is not the ID of an actual person from the black list. It can be interpreted as "person not part of the black list" and thus, $p(0(D_1)$ is the probability that the observed person is none of the people on the black list.

The likelihood model 25B reflects the probability if detection $D_1$ belongs to person i. This model has to be learned a priori by means of machine learning algorithm. For score values, a good choice for a likelihood model is a Gaussian mixture.

For this example the evaluation of the likelihood and performing the above Bayesian rule results in the following values for p $(i|D_1)$:

| i | $p(D_1|i)$ | $p(i|D_1)$ | $p(i|D_1)$ (w credibility) |
|---|---|---|---|
| 0 | 0.1 | 0.048 | 0.076 |
| 1 | 0.1 | 0.048 | 0.076 |
| 2 | 0.9 | 0.429 | 0.366 |
| 3 | 0.1 | 0.048 | 0.076 |
| 4 | 0.1 | 0.048 | 0.076 |
| 5 | 0.8 | 0.381 | 0.330 |

If in addition the credibility value should be used, there are several options. For example, the credibility value is also evaluated by means of likelihood model 25B and thus, learning likelihood model 25B is not only based on the scores but also on the credibility values. Another way is to use a modified version of the above formula according to $$p(i|D_1) = \frac{((1-c) + c \cdot p(D_1|i)) \cdot p(i)}{p(D_1)}.$$

The probability values for this version are listed in the right-hand column of the above table.

The Fusion Result 40B, i.e., the probability values, are stored as a Fusion Task 40A and the Task is stored in Task Container 40 as depicted in FIG. 2.

At time instant t=10 seconds, another detector 5 observes again the same person. (Detector 5 is unaware that this person was observed previously.) The above described process of matching with the black list is repeated and leads to the following detection $D_2$:

List of scores:
ID 2, score 0.6
ID 4, score 0.4

Time stamp: t=10 s
Credibility value c=0.8

This detection $D_2$ goes to Orchestration module 35, as shown in FIG. 2 which retrieves the previously created Task $T_1$ as this task already had a detection associated where also person 2 was part.

If for instance detection $D_2$ would have a different score list than the one above, e.g.,
ID 3, score 0.6
ID 4, score 0.4
then there would be various options:
1. Create a new task $T_2$,
2. Assign the detection to $T_1$ as the time difference $\Delta t$ between detection $D_1$ and $D_2$ is small Task $T_1$ with detection $D_2$ goes to the Fusion Engine 25, executes processing of section "B" in FIG. 3.

First, a time update 75 is performed according to $$p^-(i|D_1)=A(\Delta t) \cdot p(i|D_1)$$

Where $A(\Delta t)$ is a so-called transition matrix depending on the time difference $\Delta t$ and $p^-(i|D_1)$ is the predicted probability. The transition matrix is based on a statistical model that reflects the distribution of travel times between two detectors 5*i* and 5*j*.

For simplicity let the transition matrix be $A(\Delta t)$ the identity matrix, which can be interpreted as "plausible transition" of a person between both recognition systems. Thus, it holds that $p^-(i|D_1)=p(i|D_1)$. Next, the measurement update 70, i.e., Bayesian rule, is performed in order to calculate the probability values $p(i|D_1, D_2)$ according to $$p(i|D_1, D_2) = \frac{p(D_2|i) \cdot p^-(i|D_1)}{p(D_2)}$$

with values as in the following table:

| i | $p(D_2|i)$ | $p(i|, D_1, D_2)$ | $p(i|D_1, D_2)$ (w credibility) |
|---|---|---|---|
| 0 | 0.1 | 0.011 | 0.025 |
| 1 | 0.1 | 0.011 | 0.025 |
| 2 | 0.8 | 0.809 | 0.668 |
| 3 | 0.1 | 0.011 | 0.025 |
| 4 | 0.6 | 0.067 | 0.060 |
| 5 | 0.1 | 0.090 | 0.198 |

Hence, the probability that the observed person is actually person 2 became significantly higher.

Fusion task result 40B is output to an output device 60 and may be displayed as text or various forms of graphical representations, according to certain embodiment.

The fusion-based object-recognition system advantageously enables unsupervised learning of transition models from travel times between recognition systems, incorporation of transition model into fusion to provide higher detection accuracy and a lower false alarm rate.

Bayesian fusion of multiple scores and travel time enables fusion of detections that can be performed sequentially, thereby reducing computation time relative to batch approaches. The modular structure of likelihood and transition models based on "basic operators" allows simplified creation of complex models and the incorporation of additional information (e.g., expert knowledge, sensor information), and incorporation of credibility values into fusion.

It should be appreciated that combinations of various features set forth in different examples are also included within the scope of present invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A fusion-based method of object recognition comprising:
   capturing a first object image with a first image capture detector;
   generating a first score indicative of a first probability that the first object image corresponds to a data base image; and
   using a processor to apply a Bayesian fusion algorithm to revise the first probability based on a second score of a second object image indicative of a second probability that the second object image corresponds to the data base image, captured by a second image capture detector, other than the first image capture detector,
   wherein said using a processor to apply the Bayesian fusion algorithm further includes applying a transition model, configured to calculate a transition probability of an object moving from the first image capture detector to the second image capture detector in time t, wherein said time t is the time difference between a capture time of the first object image and a capture time of the second object image to revise the first probability.

2. The fusion-based method of claim 1, wherein the processor is further configured to use credibility ratings associated with the first object image and the second object image to revise the first probability.

3. The fusion-based method of claim 1, wherein generating a first or second score indicative of a first or second probability that the first or second object image corresponds to a data base image of a person i is calculated with i=0, . . . , n, is:

$$p(i|D_1) = \frac{p(D_1|i) \cdot p(i)}{p(D_1)},$$

where $p(i)$ is the prior probability of the person i, $p(D_1|i)$ is a likelihood of detection $D_i$, and $p(D_1)$ is a normalization constant, and
wherein applying the Bayesian fusion algorithm is performed in order to calculate the probability values $p(i|D_1,D_2)$ according to $$p(i|D_1, D_2) = \frac{p(D_2|i) \cdot p^-(i|D_1)}{p(D_2)}$$

where a time update $p^-(i|D_1)$ is performed according to $$p^-(i|D_1)=A(\Delta t) \cdot p(i|D_1)$$

where $A(\Delta t)$ is a transition matrix depending on the time difference $\Delta t$ and $p^-(i|D_1)$ is the predicted probability.

4. A fusion-based, object-recognition system comprising:
   a plurality of image capture detectors, each of the image capture detectors configured to generate a first score indicative of a first probability of correspondence between a first object image it captured and an image in a data base;

a processor configured to apply a Bayesian fusion algorithm to revise the first probability based on a second score of a second object image indicative of a second probability that the second object image corresponds to the image in the data base, captured by a second image capture detector, wherein the processor is further configured to apply a transition model configured to calculate a transition probability of an object moving from the first image capture detector to the second image capture detector in time t, wherein said time t is the time difference between a capture time of the first object image and a capture time of the second object image to revise the first probability.

5. The fusion-based object-recognition system of claim 4, wherein the processor is further configured to use credibility ratings associated with the first object image and the second object image to revise the probability.

* * * * *